INVENTOR.
DAVID I. SMITH
BY

June 11, 1963   D. I. SMITH   3,093,399
WHEEL SLIP SUPPRESSION SYSTEM
Filed March 6, 1961   2 Sheets-Sheet 2

INVENTOR.
DAVID I. SMITH
BY Robert H. Montgomery
ATTORNEY under System
David I. Smith, Erie, Pa., assignor to General Electric
Company, a corporation of New York
Filed Mar. 6, 1961, Ser. No. 93,714
12 Claims. (Cl. 291—2)

This invention relates to rail vehicle wheel slip correction systems, and more particularly to a wheel slip suppression system which automatically detects and suppresses wheel slip.

Locomotive wheel slippage is an ever-present problem encountered by railroads. The problem is presented by insufficient adhesion between wheel and rail for the propulsive torque exerted on the wheel. In modern locomotives having individually powered axles, there is often neither sufficient sound nor notice of loss of tractive effort when a wheel slipping condition occurs to warn the engineman. Therefore, systems have been derived for detecting and automatically correcting wheel slippage. These proposed systems have detected such slippage by measuring differences in traction motor current or voltage, or using axle-mounted generators to derive voltage signals proportional to axle speeds and detect signal differentials therebetween. The majority of these systems have reduced, in some manner, motor torque to halt the slipping activity, while some systems have been proposed to activate locomotive air brakes to suppress wheel slip activity. Presently used wheel slip detection systems are also arranged to activate audible and/or visual alarms to alert the locomotive's engineman that a slipping condition exists, and many automatically actuate sanding devices which supply sand between the track and wheels to increase the adhesion therebetween upon detection of a slipping condition and continue sanding for a fixed time.

It has been determined that a great many wheel slips are minor in severity and self-correcting, or may be automatically corrected by a slight reduction in net torque exerted on the slipping wheels, and need not be brought to the attention of the engineman. In wheel slip correction systems which rely on reduction of traction motor torque to correct wheel slippage, reapplication of motor torque to the pre-slipping value often causes wheel slippage to reoccur. In some instances, particularly where the locomotive is heavily loaded, as on a grade, or when a relatively slippery section of track is encountered, a wheel may alternately slip and roll for a long period of travel, and to call all such slips to the attention of the engineman may result in confusing the engineman as to the severity of the slipping condition and he may initiate unneeded corrective action. Additionally, application of sand between wheel and rail upon detection of all wheel slipping activity would soon exhaust the locomotive's supply of sand, and no sand would be available when the need was greater.

A diesel-electric locomotive may commence a run loaded with as much as 10 tons of fuel plus sand, and in some cases water for a steam-generating unit. As the run progresses, these materials are expended, and therefore the weight of the locomotive decreases, resulting in a decrease of weight on driving wheels and a decrease in tractive effort (which is proportional to the weight on the driving wheels). Therefore, as the locomotive run progresses, the decrease in weight results in decreased adhesion between wheel and rail, which emphasizes the necessity of having sufficient sand for wheel and rail sanding purposes toward the end of the run.

It is therefore a primary object of this invention to provide a new and improved wheel slip suppresion system which, upon detection of wheel slip activity, initiates corrective action to suppress the wheel slip activity, which sums or integrates the degree of such corrective action, and hence wheel slip activity with respect to time, and if such summation exceeds a predetermined value, initiates sanding between rail and wheels for a given time to enable the locomotive "to regain its footing." It is a further object to initiate and continue such sanding for a predetermined time, dependent upon the history of wheel slip activity as torque or the driving wheels is restored after suppression of wheel slippage.

Briefly stated, these and other objects of the invention are achieved in one form thereof by detecting locomotive wheel slips and automatically actuating the locomotive air brakes to suppress wheel slippage, and summing the degree of air brake suppression activity with respect to time to actuate automatic sanding between wheel and rail when the wheel slip activity reaches a predetermined value.

The features of the invention which are believed to be novel are set forth with particularity in the appended claims. The invention itself, however, both as to its organizations and methods of operation, together with further objects and advantages thereof, may best be understood by referring to the following descriptions taken in conjunction with the following drawings wherein:

To detect wheel slip activity, I prefer to use the wheel slip detection system disclosed and claimed in the copending application of William B. Zelina, Serial No. 20,755, filed April 7, 1960, and assigned to the same assignee as the present invention. My invention may utilize other wheel slip detectors; however, the referenced detector is preferred due to its high sensitivity.

Figures 1, 2:
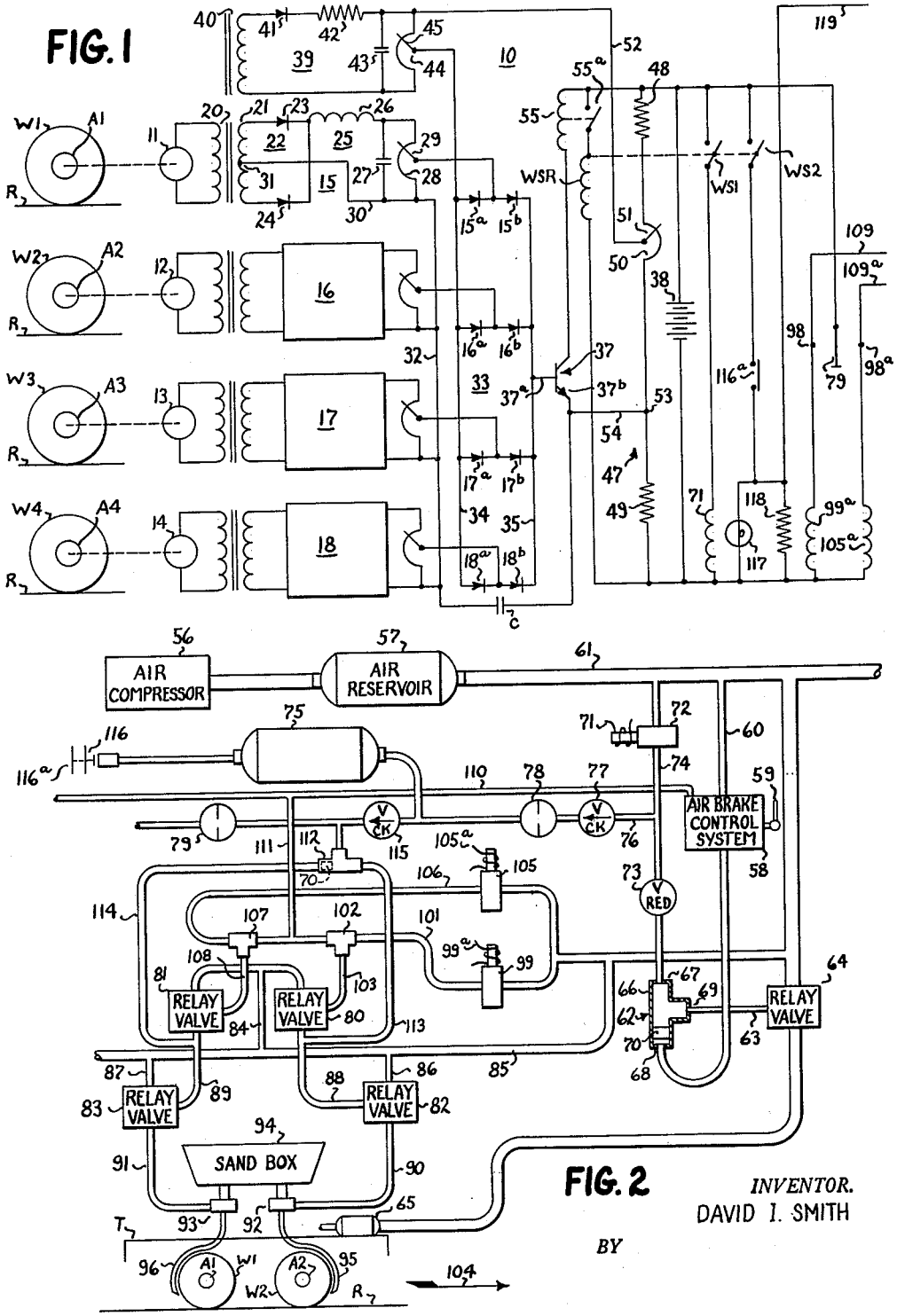
FIGURE 1 is a diagram of a wheel slip detection system.
FIGURE 2 illustrates an embodiment of the invention incorporated in a locomotive air brake system.

Reference is now made to FIG. 1 where I show a wheel slip detection system 10 which comprises generators 11, 12, 13 and 14 drivably connected to the powered axles A1, A2, A3, A4 of a locomotive, not shown, having wheels W1, W2, W3 and W4 mounted thereon respectively, which rest on rail R. The axles have traction motors, not shown, thereon drivingly engaging the axles through a conventional gear and pinion arrangement. The traction motors may be supplied electrical energy from a diesel engine driven generator from a source external of the locomotive. The generators are preferably alternators yielding a signal whose frequency is proportional to the speed of revolution of the driving axle.

The output of each of the alternators 11, 12, 13 and 14 is applied to frequency-to-voltage transducers 15, 16, 17 and 18 respectively. Inasmuch as the transducers are identical with respect to number and arrangement of elements, only transducer 15 will be described in detail. Each of these transducers 15, 16, 17 and 18 comprises a saturating transformer 19 having a rectangular hysteresis characteristic and primary and secondary windings 20 and 21. A full wave rectifier 22 comprising diodes 23 and 24 is connected to the secondary winding 21 of transformer 19. The output of the full wave rectifier 22 is applied to a filter 25 which may comprise an inductance 26 and capacitance 27, and the output of the filter is applied across potentiometer 28 having a variable tap 29. The circuit is completed through line 30 from potentiometer 28 to the center tap 31 of transformer 19. The center taps of all the transformers 19 are commonly connected through line 32 to provide a common current return for the sources of potential. The frequency-to-voltage transducers provide a direct current output voltage which is proportional to the frequency of the alternator, which in turn is proportional to its driven speed, and hence to the speed of rotation of the associated axles. Inasmuch as there may be a slight variance in the physical characteristics of the magnetic core of each transformer, the transducers may be balanced by means of variable taps 29 on potentiometers 28.

The output of each of the transducers is applied to a voltage comparison circuit 33 comprising a parallel arrangement of series diode pairs 15a, 15b; 16a, 16b; 17a, 17b; and 18a, 18b connected between common lines 34 and 35. This comparison circuit is disclosed and claimed in Patent 2,652,555 issued to Russell M. Smith and assigned to the same assignee as the present application. The output of each transducer is applied to the common connection between its associated series diode pair. If the voltage corresponding to the speed of any one axle is higher than the others, or if any voltage unbalance occurs in the comparison circuit 33, the difference in voltage corresponding to the slip speed will appear across the comparison circuit. The comparison circuit is connected to a detector circuit 36 which comprises an amplifier, preferably a transistor 37 in series-circuit relation with a source of electrical potential 38 which may be the locomotive battery. Means are provided for deriving a locomotive speed bias signal and wheel diameter differential bias signal. This reference signal may be derived from another alternator-transducer arrangement associated with an idler axle if there is an idler axle under the locomotive or mounted on the opposite end of one of the axles to the end upon which one of the transducers 15, 16, 17 or 18 is mounted. However, in the interest of simplicity and economy, it is preferred to utilize a speed bias reference network 39 which comprises an additional secondary winding 40 on one of the transformers, a rectifying element 41, and a filter comprising resistance 42 and capacitance 43. The output of the transducer is applied across a potentiometer 44 having a variable tap 45 thereon.

A voltage divider network 47 comprising resistors 48 and 49 and potentiometer 50 having a variable tap 51 thereon is connected across the voltage source 38. The output of the reference network 39 is connected to variable tap 51 of potentiometer 50 through line 52. The variable tap 45 of potentiometer 44 is connected to the negative line 34 of detector circuit 33.

The emitter 37b of transistor 37 is connected to point 53 on voltage divider 47. The base-emitter circuit of transistor 37 may be traced from comparison circuit line 35 through base 37a, emitter 37b, line 54 to point 53, tap 51 on potentiometer 50, line 52 to potentiometer 44, tap 45 on potentiometer 44, to line 34 of comparison circuit 33 and through the diode pairs to line 35. The value of resistor 49 together with the setting of tap 51 on potentiometer 50 determines the initial bias on emitter 37b and therefore the maximum allowable slip at locomotive standstill. The setting of tap 45 on potentiometer 44 determines the differential in axle speed required to operate the adhesion loss detection system with respect to locomotive speed. As locomotive speed increases, the potential of emitter 37b with respect to base 37a increases, thereby requiring a larger positive signal on base 37a to render transistor 37 conductive.

A capacitor C is connected between emitter 37b and common return line 30. The capacitor is chosen in value such that acceleration of the axles above a given value is detected. In some cases when the wheels of an axle commence to slip, the rate of acceleration is extremely high, and it is therefore desirable to detect such slippage immediately without waiting for the difference in axle speeds to be detected. Moreover, if all axles of a locomotive commence to slip, which is uncommon, the acceleration detecting capacitor C will detect slippage more rapidly than detection of speed differences, inasmuch as the current passed by the capacitor is dependent on rate of change of voltage thereacross with respect to time. Therefore, the illustrated detection network operates the wheel slip relay responsive to axle acceleration, axle speed differential or a combination of both.

When one of the axles A1, A2, A3 or A4 differs in speed from the other axles more than a magnitude predetermined by the setting of the taps 45 and 51 on potentiometers 44 and 50 respectively, the transistor is rendered conductive and current will flow through a sensitive relay 55, causing energization thereof which picks up contact 55a. When contact 55a is closed, wheel slip relay WSR, which is arranged upon energization thereof to close contactors WS1, WS2, FIG. 1; contactor WS3, FIG. 3; and contactor WS4, FIG. 4; is connected in circuit with potential source 38 and a sequence of corrective actions is then initiated, as hereinafter described.

Reference is now made to FIG. 2 in conjunction with FIG. 1, wherein like identifying numerals identify like elements, where I show a modification to the locomotive air brake system for causing suppression of detected wheel slips. In FIG. 2 I have illustrated axles A1 and A2 with wheels W1 and W2 thereon mounted on a truck T. It will be understood that the axles A3 and A4 support a similar truck, not shown, and will have the same brake system and wheel slip suppression system as hereinafter described as associated with truck T. A locomotive air brake system generally comprises an air compressor 56, which charges a main air reservoir 57 mounted on the locomotive. A pressure-regulating exhaust valve, not shown, may be mounted on the reservoir to limit the pressure therein at a predetermined value. When the locomotive engineman desires to apply the locomotive brakes, he may actuate a brake control valve in brake control system 58 by means of an operating handle represented at 59. The brake control valve may be located in a line 60 communicating with the main reservoir 57. Actuation of the brake control valve will introduce a control in signal through line 60 from line 61, shuttle valve 62 and line 63 to a relay valve 64. The relay valve 64 is of a well known type wherein a pneumatic control signal applied thereto allows the passage of air through the relay valve proportional to the magnitude of the control signal in line 63 from air line 61 to a truck-mounted brake cylinder 65. Application of air to the brake cylinder 65 will cause actuation of a suitable brake linkage, not shown, to cause brake shoes, not shown, to contact the treads of wheels W1 and W2 to produce a retarding torque thereon. Those skilled in the art will realize that a plurality of brake cylinders may be mounted on truck T to actuate clasp type brakes responsive to an output signal from relay valve 64.

I also utilize the existing locomotive air brake system to suppress wheel slip activity. The air brake slip suppression control signal is supplied to the relay valve 64 through the shuttle valve 62, which sometimes is referred to as a double check valve. The shuttle valve comprises a housing 66 having two inlets 67 and 68, and an outlet 69 leading to the relay valve 64. A shuttle member 70 is moved into either of two positions, dependent upon the relative air pressures introduced at the inlets 67 and 68. When wheel slip activity is sensed and wheel slip relay WSR is energized, contact WS1, FIG. 1, responsive to energization of relay WSR and the coil 71 of magnet valve 72 is energized to allow air to pass from line 61 through magnet valve 72, a pressure-reducing valve 73 in line 74, and into inlet 67 of shuttle valve 62. Introduction of air to the inlet 67 of shuttle valve 62 will move shuttle member 70 downwardly (as illustrated) and introduce an air signal over line 63 to relay valve 64 which will cause the introduction of air to brake cylinder 65 to cause actuation of the brakes to wheels W1 and W2 and the wheels mounted on the opposite ends of axles A1 and A2. The shuttle valve 62 in practice is mounted with the inlets 67 and 68 horizontally disposed, so that air pressure introduced into inlets 67 and 68 need only overcome frictional forces to move shuttle member 70. When wheel slip activity is no longer detected by detection network 10, wheel slip relay WSR will become de-energized and contact WS1 will drop out, which will cause coil 71 of magnet valve 72 to become de-energized and cut off the control signal to relay valve 64. The reducing valve 73 is selected to reduce the pressure applied to the relay valve upon detection of wheel slip activity to a predetermined value to cause a predetermined brake application. For purposes of illustration only, in a locomotive wherein main reservoir pressure is normally 140 p.s.i., the pressure-reducing valve 73 is seletced to produce a 15 p.s.i. brake application. It may be seen that by virtue of the shuttle valve 62, the locomotive engineman may override the application of the locomotive air brakes due to detection of wheel slippage, if it should become necessary for him to apply the locomotive air brakes.

Upon detection of wheel slip activity where locomotives are operated in multiple, it is preferred that only the brakes on the slipping locomotive unit be applied, and the system so far illustrated accomplishes this objective. In practice, the engineman's brake control system will be trainlined so that the engineman may apply brakes to all of the locomotive units. Such trainlining is not illustrated, inasmuch as the manner in which it is accomplished is well known to those skilled in the art.

In practice, I have found that a light air brake application will suppress the great majority of wheel slips that may occur. However, as those skilled in the art are familiar, quite often when the locomotive is heavily loaded, or when a slick section of rail is encountered, when wheel slip correction measures are removed, the locomotive wheels may again have a tendency to slip and the locomotive wheels may alternately slip and roll as the net propulsive torque on the wheels is first decreased to correct wheel slippage, and then increased when the wheel slipping condition is corrected. This is particularly true when the wheel slip correction means includes electrical power reduction to the traction motors upon detection of a slip, and increase of electrical power supplied to the traction motors when wheel slip activity ceases.

In accordance with the invention, I provide means to detect and sum continued wheel slip activity which may be due to the aforementioned conditions to actuate a sanding system when the wheel slip activity reaches a predetermined severity or is repetitive with respect to a measured period of time, and further to warn the engineman of the continued wheel slip activity. In one form I measure the application of the air brakes to suppress wheel slippage with respect to time, and if the air brake application exceeds a predetermined time of application during a given interval of time, a sanding system is actuated to apply sand between the wheels of the slipping locomotive unit and the rail to increase the coefficient of adhesion therebetween, and such sanding is continued for a period of time, dependent on the history of the wheel slip activity, after wheel slip activity is corrected in order that the locomotive may regain and retain adhesion to the rail. To accomplish this, I provide an air reservoir 75 connected through line 76 to line 74 on the output side of magnet valve 72 before reducing valve 73. Line 76 communicating with line 74 and reservoir 75 contains a check valve 77 and an inlet choke 78 through which reservoir 75 is charged when magnet valve 72 is actuated. The pressure build-up in reservoir 75 is a function of the time magnet valve 72 is open and the pressure at the low side of choke 78 (constant when valve 72 is open) less the pressure drop due to the bleed off through exhaust choke 79. The pressure build-up in reservoir 75 is thus a function of detected wheel slip activity and the pressure therein is indicative of the history of wheel slip activity over a time interval predetermined essentially by the relative sizes of the chokes 78 and 79.

To gain a better understanding of the invention, a typical locomotive sanding system should first be considered. The sanding system comprises forward and reverse sanding control relay valves 80 and 81 respectively, and forward and reverse sanding relay valves 82 and 83, all of which in the illustrated embodiment of the invention are actuated by pneumatic control signals. In practice the control valves 80 and 81 are preferably mounted on the locomotive and relay valves 82 and 83 are mounted near each truck. Air is supplied to control valves 80 and 81 through air line 84 from air line 85. Air is supplied to relay valves 82 and 83 through lines 86 and 87 respectively from air line 85. The output of control valves 80 and 81 provide control signals to relay valves 82 and 83 over lines 88 and 89 respectively. The outputs of relay valves 82 and 83 are respectively applied over lines 90 and 91 to sand traps 92 and 93 beneath sand box 94 to blow sand into sand pipes 95 and 96, and hence between wheel and rail.

The engineman may manually actuate either the forward or reverse portion of the sanding system by switch 97, FIG. 1. If switch 97 is closed on forward contact 98, coil 99a of magnet valve 99 will be energized. Energization of coil 99a will open magnet valve 99 to apply a control signal to sanding control valve 80 from air line 85, over line 101 through shuttle valve 102 and over control line 103. Actuation of control valve 80 in turn causes application of a pneumatic control signal over line 88 to relay valve 82 and therefore discharge of sand from sand pipe 95, assuming the forward direction to be in the direction of arrow 104.

Manual control of sanding in the reverse direction is accomplished by closing switch 97 on contact 98a which energizes coil 105a of magnet valve 105 to introduce air from air line 85, over line 106, through shuttle valve 107 to control line 108 to actuate control valve 81 which supplies a pneumatic signal to relay valve 83 which causes discharge of sand from sand pipe 96. The engineman's sanding controls are electrically trainlined over lines 109 and 109a to other units comprising the locomotive. Provision is also made for sanding upon an emergency brake application. Emergency brake line 110 runs from the air brake control system to shuttle valves 102 and 107 through line 111, and when line 110 is charged upon an emergency brake application, sand is applied through both forward and reverse sanders.

When wheel slip activity is detected and magnet valve 72 is opened to admit air to shuttle valve 62 to apply the locomotive brakes to suppress the slip, air pressure commences to build up in reservoir 75. When the pressure therein reaches a predetermined value, a pneumatic control signal is applied to relay valve 82 through shuttle valve 112 and lines 113 and 88 or relay valve 83 through shuttle valve 112 and lines 114 and 89, dependent on the position of the shuttle member 70 in shuttle valve 112.

Shuttle valve 112 has the same structure as that of valve 62, which is shown in section, and includes a shuttle member 70 which is moved into either of two positions (left or right in FIG. 2) dependent upon whether air is introduced through line 113 or 114 respectively. As shown more clearly in the sectioned view of valve 62, shuttle member 70 is not biased into any position but is moved when the air pressure introduced through line 113 or 114 overcomes the frictional forces. Once positioned, for example to the left as shown, by introduction of air through line 113, shuttle member 70 remains in that position due to the frictional forces. Shuttle member 70 may then be moved to the other position by introduction of air through line 114.

Shuttle valve 112, therefore, is effectively a memory device which is positioned by an initial manual sanding application. For example, should forward sanding be initiated manually, the output of valve 80 would, through line 113, position the shuttle member 70 of valve 112 to block line 114. Thereafter shuttle valve 112 remains in this position due to frictional forces and so "remembers" the direction of travel of locomotive, and is positioned to initiate sanding in front of the forward traveling wheels. Check valve 115 prevents the positioning signal from feeding back into reservoir 75.

Arranged to be actuated by a predetermined air pressure in reservoir 75 is a pressure switch 116 having contact 116a. When wheel slip on a locomotive unit continues or has a given repetition in a given time, the pressure in reservoir 75 sums the wheel slip activity and actuates switch 116 to close contact 116a.

When contact 116a closes, visual 117 and audible 118 alarms are sounded to notify the engineman of the wheel slip activity and that automatic sanding has commenced.

The alarm signals are trainlined through the several units of a locomotive by provision of a trainline 119; however, it is preferred to interrupt the alarm when wheel slip is suppressed by opening contactor WS2, which was closed upon energization of relay WSR, even though automatic sanding will continue until the pressure in reservoir 75 drops to a value insufficient to hold a sanding relay valve open.

Figure 3:
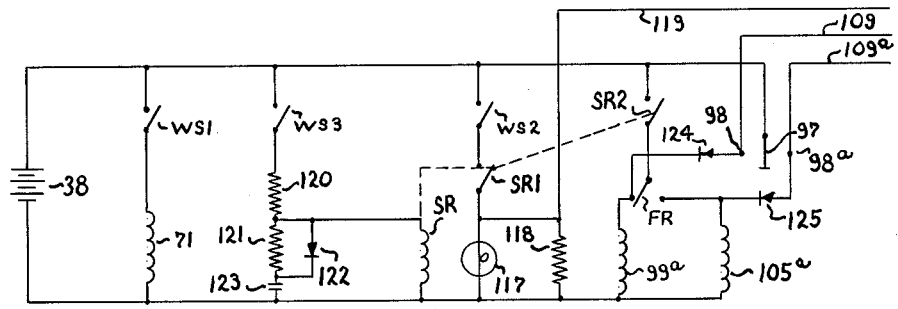
FIGURE 3 illustrates a modification of the system of FIGURES 1 and 2.

In FIG. 3 I show a modified form of the invention wherein automatic sanding may be accomplished electrically. In FIG. 3 I provide an electrical circuit for summing wheel slip activity which comprises resistances 120 and 121, diode 122, capacitor 123, and sanding relay SR controlling contactors SR1 and SR2. When wheel slip activity is detected and relay WSR is energized, contactor WS3, controlled by relay WSR, will pick up, and capacitor 123 will charge through resistance 120 and diode 122. When capacitor 123 has charged to a voltage determined by the value of resistance 120 and capacitance 123, sanding relay SR will become energized to pick up contactors SR1 and SR2. Wheel slip relay contactor WS2 had previously been picked up when wheel slip relay WSR was energized. When contactor SR1 is closed, audible and visual alarms 117 and 118 will be energized and trainlined as heretofore explained. When sanding relay contactor SR2 is closed, upon energization of relay SR, one of the magnet coils 99a, as illustrated, will be energized through switch FR to initiate sanding in the forward direction. Switch FR is preferably interlocked with the engineman's forward-reverse selector, not shown, so that switch FR is in a position to provide a circuit path through coil 99a or 105a, dependent upon the direction of motion of the locomotive. When wheel slip activity ceases and contact WS3 drops out, capacitor 123 will discharge through resistance 121 and relay SR, and when the voltage across relay SR decreases below the drop out value of relay SR, contactors SR1 and SR2 will drop out. When contactor SR2 drops out, automatic sanding is ceased.

It will be seen that the voltage across capacitor 123 will build up with respect to time as wheel slip activity is detected in the same manner as air pressure builds up in reservoir 75 when the slip suppression brake is applied. When the configuration of FIG. 3 is utilized, such utilization eliminates the need for the reservoir 75, valves 77, 112 and 115, chokes 78 and 79, line 76, and associated piping. Furthermore, it will be seen that the sanding relay SR is analogous to the pressure switch 116 of FIG. 2. In this embodiment of the invention, diodes 124 and 125 are provided to prevent trainlining an automatic sanding signal over trainlines 109 and 109 a respectively.

Figure 4:
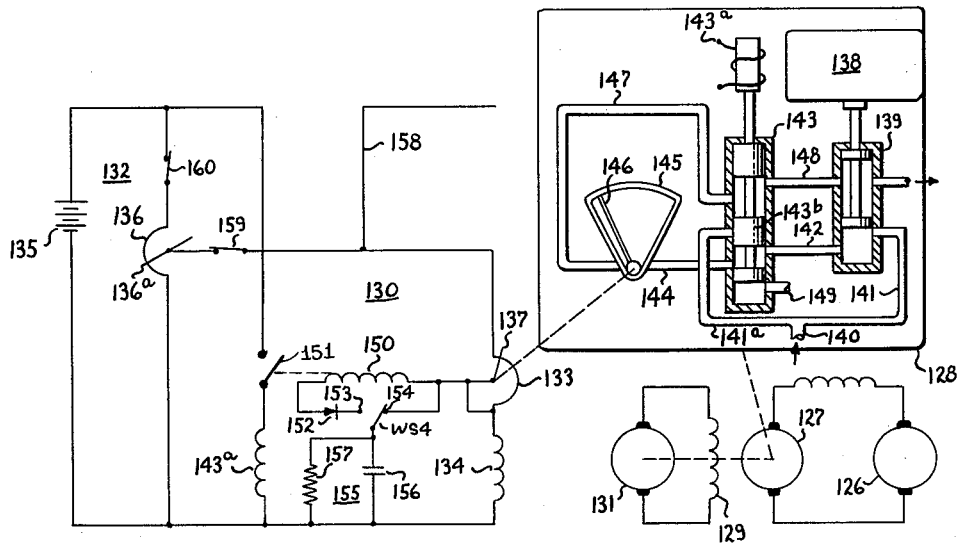
FIGURE 4 illustrates a traction motor control system with which the present invention cooperates.

The invention is further useful in conjunction with a wheel slip correction system wherein the correction means include reduction of electrical power supplied to the traction motors upon detection of wheel slip activity. In FIG. 4 I illustrate a traction generator excitation control system wherein traction generator excitation and hence electrical power supplied to the traction motors is reduced at a timed rate upon detection of wheel slip activity. The excitation system illustrated in FIG. 4 is disclosed and claimed in the copending application of Russell M. Smith, Serial No. 93,175, filed on the same date as this application and assigned to the same assignee as the present invention.

In FIG. 4 is shown one traction motor 126 of an electrically propelled locomotive unit, not shown, which is supplied electrical energy by a traction generator 127 driven by a prime mover 128, such as a diesel engine. The generator 127 has a separately excited field 129, the degree of excitation of which determines the magnitude of the electrical energy supplied the traction motors. Excitation of the traction generator field 129 is controlled through an excitation control network 130 which includes an exciter generator 131 connected across traction generator field 129. The excitation control system further comprises a voltage source 132 in series with exciter field load rheostat 133 and exciter field 134. The voltage source 132 is represented as battery 135 and potentiometer 136 with variable tap 136a; however, it is to be understood that these circuit elements are merely representative of any voltage supply under control of the engineman wherein the voltage setting determines the power demand placed on the prime mover 128. It may thus be seen that energization of the exciter field is determined by the voltage at tap 136a of potentiometer 136 plus the series resistance of rheostat 133 determined by position of arm 137, which is under control of the governor 138 of engine 128.

The governor 138 through a pilot valve 139 controls fuel supplied to the prime mover in a manner well known to those skilled in the art to cause operation of the locomotive prime mover at any of a plurality of constant values of speed and load. The governor 138 has conventional speed and load-setting means, not shown, by virtue of which constant values of output from the prime mover may be obtained. The pilot valve 139 is shown in its maximum speed setting position and hydraulic pressure from a source, not shown, introduced in a supply pipe 140 passes through line 141, through pilot valve 139, through line 142, a governor overriding solenoid valve 143, line 144 into the housing of a vane motor 145 to move vane 146 to the position shown. Vane 146 is driveably connected to arm 137 of rheostat 133, and the position of vane 146 corresponds to the illustrated position of arm 137 of rheostat 133. The pressure in vane motor housing 145 is relieved through line 147, solenoid valve 143, line 148, pilot valve 139 and return to the hydraulic pressure source. The solenoid valve is so arranged that should the coil 143a thereof be energized, the valve will move downwardly and valve portion 143b will block communication of lines 142 and 144. Hydraulic pressure is now introduced into vane motor 145 through line 141a, solenoid valve 143 and line 147, and therefore vane 146 will commence to move in a clockwise direction and drive arm 137 of rheostat 133 in such a direction as to increase the resistance of rheostat 133 in series with exciter field 134, and therefore reduce the current through field 134. As vane 146 moves in a clockwise direction, hydraulic fluid will be exhausted from vane motor 145 through lines 144 and 149 and returned to the fluid pressure source. It will therefore be seen that the solenoid valve 143 may override the governor in controlling the exciter field load resistance.

A relay 150 is provided which controls contactor 151 in series with the coil 143a of the overriding solenoid across a voltage source 132. The relay 150 is polarized, which is illustrated by means of a diode element 152 in series therewith and is arranged to close contactor 151 when energized. One terminal of the relay coil 150 is further connected to the arm 137 of rheostat 133, and the coil 150 and diode element 152 are connected across terminals 153 and 154 which may be selectively contacted by a contactor WS4 of wheel slip relay WSR, FIG. 1. Contactor WS4 is further connected to a timing circuit 155 which comprises a capacitance 156 and a resistance 157.

It will be seen that the capacitor 156 will normally charge to the voltage at arm 137 of rheostat 133 when contactor WS4 in its normal operating position contacts terminal 154, which by virtue of the connection of arm 137 to the low voltage side of rheostat 133 is the voltage across field 134. Assume now that there is loss of adhesion due to a slipping condition of one of the wheels and relay WSR is energized. Contactor WS4 responsive to energization of relay WSR, FIG. 1, will be switched to terminal 153 and relay 150 will be placed in series between rheostat arm 137 and capacitor 156. Capacitor 156 will then discharge through resistance 157 at a timed rate determined by the values of capacitance 156 and resistance 157. When the voltage across capacitor 156 decreases due to discharge of capacitance 156 through resistance 157, there will be a flow of current from arm 137 through relay coil 150 and diode 152 inasmuch as the potential at arm 137 will exceed the voltage across the capacitance 156. When current flows through and energizes relay 150, contactor 151, responsive to energization of relay 150, will close and complete a circuit through solenoid valve coil 143a from battery 135 which will produce a current therethrough to energize coil 143a and cause the solenoid valve to move downwardly from the position illustrated. Valve portion 143b will block communication between lines 142 and 144 and lines 141a and 147 will commnuicate through solenoid valve 143 to provide a clockwise force on vane 146. The right hand (as illustrated) portion of vane motor will be vented through line 144, valve 143 and line 149. As vane 146 is driven in a clockwise direction, it also drives arm 137 of rheostat 133 in a clockwise direction (as illustrated) to insert resistance in series with exciter field 134. The movement of arm 137 along rheostat 133 decreases the voltage at arm 137 and when the voltage difference between capacitor 156 and arm 137 no longer exceeds the drop out value of relay 150, contact 151 will be opened to deenergize solenoid valve 143 and fluid pressure will again be admitted to the vane motor 145, which will tend to drive vane 146 in a counterclockwise direction. However, the charge will continue to leak off of capacitor 156 through resistance 157 and the above-described action will repeat to increase the resistance in series with exciter field 134 which decreases the excitation of exciter 131, and hence the excitation of traction generator 127, which in turn decreases the electrical power supplied to traction motor 126, and hence the propulsive torque applied to the locomotive wheels W. This timed reduction in excitation of the traction generator, and hence propulsive torque applied to the wheels, will continue until wheel slip relay WSR drops out when a loss of adhesion between wheels and rail is no longer detected.

At this time vane 146 of vane motor 145 is moved in a counterclockwise direction by fluid pressure and movement of vane 146 moves arm 137 of rheostat 133 in a counterclockwise direction to decrease the resistance in series with exciter field 134, and therefore increases the excitation of traction generator 127 to the pre-adhesion loss detection level.

The engineman's control signal appearing at tap 136a may be train-lined over line 158 to similar systems in trailing locomotive units wherein switches 159 and 160 would be opened to place all units under control of the leading unit.

Figure 5:
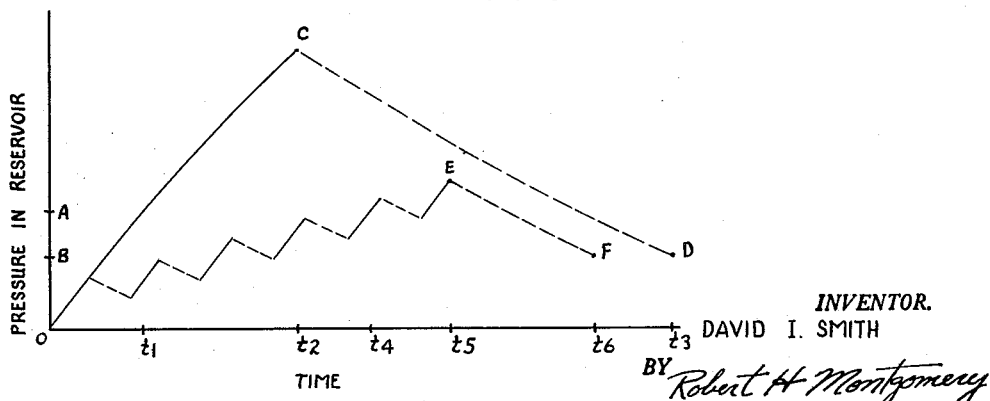
FIGURE 5 graphically illustrates the operation of the invention.

Reference is now made to FIG. 5 wherein I graphically illustrate operation of the invention with respect to the automatic sanding feature of FIG. 2. FIG. 5 is a plot of the pressure of the air in summing reservoir 75 as ordinate and time as abscissa. The solid lines indicate build-up of air pressure in reservoir 75, and also the time relay WSR is energized, and therefore the time duration of detected wheel slip activity. The dashed lines indicate bleed-off of air through choke 79. Point A on the ordinate indicates the pressure at which sanding relay valve 82 or 83 will be actuated by control signals over lines 113 or 114 respectively to pass air to the sand traps; and point B on the ordinate indicates the air pressure at which sanding relay valves will drop out to cease automatic sanding. Line OC represents pressure build-up in reservoir 75 when relay WSR is picked up and magnet valve 72 is opened to apply the locomotive air brakes to halt a continuous slipping condition. When the pressure in the reservoir reaches value A at time $t_1$ one of the sanding relay valves is opened to initiate automatic sanding which will continue until the pressure in reservoir 75 decreases along line CD due to bleed-off through choke 79 at time $t_3$. At time $t_2$ pressure build-up in reservoir 75 has ceased, due to cessation of wheel slip; however, automatic sanding continues for time interval $t_2$ to $t_3$ which is a function of the summation of the time of detected wheel slip activity from time O to time $t_2$.

Line OE represents small repetitive wheel slip activity that is repeatedly corrected by air brake suppression and/or reduction in traction generator excitation. The repetitive slips have been summed in reservoir 75, and at time $t_4$ such summation has built up the air pressure in reservoir 75 to a value sufficient to initiate automatic sanding which continues past time $t_5$ when wheel slip activity has been halted to time $t_6$ when the pressure in reservoir 75 falls to value B. Thus, automatic sanding continues from time $t_5$ to time $t_6$ after application of the slip suppressing air brake and/or reduction of traction generator excitation is ceased. The time interval $t_5$ to $t_6$ is dependent upon the pressure built up in reservoir 75 when wheel slip activity is no longer detected, and hence is a function of the history of the detected wheel slip activity.

It will be apparent that graphical illustration of electrical summation of detected wheel slip activity with respect to time as explained in conjunction with FIG. 3 would appear essentially the same for the same conditions as FIG. 5. The electrical summation of wheel slip activity, as is apparent, may be made by summing the time of reduction of generator excitation in response to detected wheel slip by summing the time wheel slip relay WSR is energized if so desired, or if the air brakes are not used to suppress wheel slippage.

Through this disclosure I have used the terms "sand" and "sanding" system; however, it is to be understood that through use of these terms I refer to any substance in pulverized, powdered or small particle form or otherwise which is applied between wheel and rail or on the wheel or rail to increase the coefficient of adhesion therebetween; and a system for applying such substance.

While I have described various embodiments of the invention, and modifications thereof selected for purposes of disclosure, other embodiments and modifications of the disclosed invention may occur to those skilled in the art which do not depart from the spirit and scope of the invention. Accordingly, it is intended to cover all modifications of the invention and changes in the illustrations chosen for purposes of disclosure which do not constitute departures from the spirit and scope of the invention.

What I claim as new and desire to secure by Letters Patent of the United States is:

1. For use with a locomotive having powered axles with wheels thereon adapted to have rolling contact with rail, means for detecting slippage of the wheels on the rail, means operable by said detecting means in response to detection of wheel slippage for reducing the propulsive torque exerted on the wheels, and a sanding system adapted to apply sand between wheel and rail to increase the coefficient of adhesion therebetween; means for summing the time of reduction of propulsive torque in response to detection of wheel slippage, said summing means being effective to actuate said sanding system to apply sand between wheel and rail when the summation of the time application of the reduction in propulsive torque exceeds a predetermined value within a given time interval and to continue actuation of said sanding system for a length of time predetermined by the summation of the wheel slip activity.

2. For use with a locomotive comprising a plurality of locomotive units each having powered axles with wheels thereon adapted to have rolling contact with rail, means for detecting slippage of the wheels on the rail, means operable by said detecting means in response to detection of wheel slippage for reducing the propulsive torque exerted on the wheels, and a sanding system adapted to apply sand between wheel and rail to increase the coefficient of adhesion therebetween; means on each unit for summing the time of reduction of propulsive torque on the wheels of that unit in response to detection of slippage of the wheels of that unit, said summing means being effective to actuate said sanding system on the unit experiencing wheel slippage to apply sand between wheels and rail when the summation of the time of reduction in propulsive torque exceeds a predetermined value within a given time interval and to continue actuation of said sanding system for a length of time predetermined by the summation of the wheel slip activity.

3. For use with a locomotive having powered axles with wheels thereon adapted to have rolling contact with rail, means for detecting slippage of the wheels on the rail, an air brake system including braking elements arranged to be forced into contact with the locomotive wheels to brake the wheels upon actuation of said braking system, and a sanding system adapted to apply sand between wheel and rail to increase the coefficient of adhesion therebetween; means operable by said detecting means in response to detection of wheel slippage for actuating the air brake system to brake the locomotive wheels until wheel slippage is no longer detected, means for summing the time of actuation of the air brake system in response to detection of wheel slippage, said summing means being effective to actuate said sanding system to apply sand between wheel and rail when the summation of the time application of said air brake system in response to detection of wheel slippage exceeds a predetermined value within a given time interval and to continue actuation of said sanding system for a length of time predetermined by the summation of the detected wheel slippage.

4. For use with a locomotive having powered axles with wheels thereon adapted to have rolling contact with rail, means for detecting slippage of the wheels on the rail, a sanding system adapted to apply sand between wheel and rail to increase the coefficient of adhesion therebetween; means operable by said detecting means in response to detection of wheel slippage for reducing the power supplied to the axles, means for summing the time of reduction of power supplied to the axles in response to detection of wheel slippage, said summing means being effective to cause actuation of said sanding system to apply sand between wheel and rail when the summation of the time of reduction in power to said axles exceeds a predetermined value within a given time interval and to continue actuation of said sanding system for a length of time predetermined by the summation of the time of reduction of power to said axles.

5. For use with a locomotive having powered axles with wheels thereon adapted to having rolling contact with rail, means for detecting slippage of the wheels on the rail, an air brake system including braking elements arranged to be forced into contact with the locomotive wheels to brake the wheels upon actuation of said braking system, and a sanding system adapted to apply sand between wheel and rail to increase the coefficient of adhesion therebetween; means operable by said detecting means in response to detection of wheel slippage for actuating the air brake system to brake the locomotive wheels until wheel slippage is no longer detected, means for summing the time of actuation of the air brake system in response to detection of wheel slippage within a predetermined time interval, said summing means being effective to actuate said sanding system to apply sand between wheel and rail when the summation of the time of actuation of said air brake system in response to detection of wheel slippage exceeds a predetermined value within a given time interval and to continue actuation of said sanding system for a length of time predetermined by the summation of the detected wheel slippage.

6. In a locomotive having powered axles with wheels thereon adapted to have rolling contact with rail, means for detecting slippage of the wheels on the rail, an air brake system including a brake cylinder arranged when pneumatically actuated to force braking elements into contact with the locomotive wheels, a compressed air source, conduit means for pneumatically connecting the air source to the brake cylinder including a pneumatically controlled relay valve having control means adapted to allow passage of air from the air source to the brake cylinder upon application of a pneumatic control signal to the control means: means operable by said detecting means in response to detection of wheel slippage for supplying a pneumatic control signal to said relay valve control means to brake the locomotive wheels to suppress the wheel slippage; an air reservoir arranged to be charged with air as a function of the time the pneumatic control signal is applied to said relay valve control means; and a sanding system for applying sand between locomotive wheels and rail, said sanding system being responsive to a predetermined pressure in said reservoir to apply sand between wheels and rail until the pressure in said reservoir falls below a predetermined value.

7. In a locomotive having powered axles with wheels thereon adapted to have rolling contact with rail, means for detecting slippage of the wheels on the rail, an air brake system including a brake cylinder arranged when pneumatically actuated to force braking elements into contact with the locomotive wheels, a compressed air source, conduit means for pneumatically connecting the air source to the brake cylinder including a pneumatically controlled relay valve having control means adapted to allow passage of air from the air source to the brake cylinder upon application of a pneumatic control signal to the control means: pneumatic conduit means including a magnet valve connecting the pressure source to said relay valve control means; means operable by said detecting means in response to detection of wheel slippage for energizing said magnet valve to cause application of a pneumatic control signal to said relay valve control means to brake the locomotive wheels to suppress the wheel slippage; an air reservoir connected to said pneumatic conduit means whereby the air pressure in said reservoir builds up as a function of the time said magnet valve is energized, an exhaust vent for allowing bleed-off of the pressure in said reservoir; a locomotive sanding system including a sand trap and conduit means connecting said sand trap to an air pressure source through a sanding relay valve having pneumatic control means for opening said sanding relay valve to allow sand to be blown from said sand trap between the locomotive wheels and rail, said sanding relay valve control means being pneumatically connected to said reservoir whereby said sanding relay valve is opened when the pressure in said reservoir reaches a predetermined valve and remains open until the pressure in said reservoir falls below a predetermined value whereby said sanding system is actuated as a function of wheel slip activity and continues to be actuated after cessation of detection of wheel slippage for a period of time dependent on the time duration of detected wheel slippage in a given interval of time.

8. In a locomotive having powered axles with wheels thereon adapted to having rolling contact with rail, means for detecting slippage of the wheels on the rail, means operable by said detecting means for reducing the propulsive torque applied to the wheels upon detection of wheel slippage, a voltage source and a sanding system adapted to apply sand between wheel and rail to increase the coefficient of adhesion therebetween; a resistance-capacitance network, means responsive to detection of wheel slip activity for connecting said network across the voltage source upon detection of wheel slippage whereby the voltage across the capacitor increases as a function of the time of detected wheel slip activity, means responsive to a predetermined voltage across said capacitor for actuating said sanding system to apply sand between wheels and rail so long as the voltage across said capacitor exceeds a predetermined value whereby said sanding system is actuated as a function of the history of detected wheel slippage after cessation of detection of wheel slippage.

9. In a locomotive having powered axles with wheels thereon adapted to have rolling contact with rail, means for detecting slippage of the wheels on the rail, means operable by said detecting means in response to detection of wheel slippage for reducing the propulsive torque exerted on the wheels, an air brake system including a brake cylinder arranged when pneumatically actuated to force braking elements into contact with the locomotive wheels, a compressed air source, conduit means for pneumatically connecting the air source to the brake cylinder including a pneumatically controlled relay valve having control means adapted to allow passage of air from the air source to the brake cylinder upon application of a pneumatic control signal to the control means; means responsive to detection of wheel slippage for supplying a pneumatic control signal to said relay valve control means to brake the locomotive wheels to suppress the wheel slippage, an air reservoir arranged to be charged as a function of the time the pneumatic control signal is applied to said relay valve control means, a sanding system for applying sand between locomotive wheels and rail, said sanding system being reponsive to a predetermined pressure in said reservoir to apply sand between wheels and rail until the pressure in said reservoir falls below a predetermined value.

10. For use with a locomotive having powered axles with wheels thereon adapted to have rolling contact with rail, means for detecting slippage of the wheels on the rail, an air brake system including braking elements arranged to be forced into contact with the locomotive wheels upon actuation of said braking system, means operable by said detecting means in response to detection of wheel slippage for actuating the air brake system to brake the locomotive wheels until wheel slippage is no longer detected, and a sanding system adapted to apply sand between wheel and rail to increase the adhesion therebetween: the improvement comprising, means for summing the time of actuation of said air brake system in response to detection of wheel slip within a predetermined time interval, said summing means being effective to actuate said sanding means to apply sand between wheel and rail when the summation of the time of actuation of said air brake system in response to detection of wheel slippage exceeds a predetermined value within a given time interval.

11. The invention of claim 10 wherein said means for summing comprises an air reservoir arranged to be charged with air when the air brake system is actuated in response to detection of wheel slippage.

12. The invention of claim 11 further comprising an engineman warning signal and means responsive to the pressure in said reservoir for causing operation of said warning signal when the pressure in said reservoir reaches a value sufficient to actuate the sanding system.

References Cited in the file of this patent

UNITED STATES PATENTS

| | | |
|---|---|---|
| 2,332,584 | McCune | Oct. 26, 1943 |
| 2,492,276 | Elsworth | Dec. 27, 1949 |
| 2,652,555 | Smith | Sept. 15, 1953 |
| 2,848,262 | Lillquist | Aug. 19, 1958 |